March 8, 1960 P. KERNAN 2,928,083
RANGE VOLTAGE GENERATING CIRCUIT FOR AN AUTOMATIC TRACKING LOOP
Filed Jan. 24, 1957

PAUL KERNAN
INVENTOR

BY
Killman and Kerst
ATTORNEYS ent Office 2,928,083
Patented Mar. 8, 1960

2,928,083

RANGE VOLTAGE GENERATING CIRCUIT FOR AN AUTOMATIC TRACKING LOOP

Paul Kernan, Baltimore, Md., assignor to Bendix Aviation Corporation, Towson, Md., a corporation of Delaware Application January 24, 1957, Serial No. 636,210

5 Claims. (Cl. 343—7.3)

This invention relates to circuits forming a part of an automatic tracking loop of an electronic distance measuring system.

Such systems usually comprise a conventional radar system equipped with means for repetitively sweeping a gating voltage over the range-time domain of the system, and means for stopping the movement of the gate when a video echo signal is encountered and thereafter causing the gate to follow the movements of the echo signal in range. The latter means is called a "tracking loop" and its general makeup and manner of functioning are described in an article by the applicant, appearing in the magazine "Aero Digest Aviation Engineering," issue of July, 1956, beginning at page 32 and entitled, "Range Measuring Systems Using Pulse Techniques."

Fig. 5 of that article depicts a tracking loop of such a system in block diagrammatic form, which diagram has been substantially reproduced as Fig. 1 of the instant application. One component of the loop is a sweep generator and it is with this portion of the system that the present invention is concerned. Previous sweep generators have required a considerable number of tubes. The instant invention greatly reduces the number of tubes required to produce the desired range voltage.

It is, accordingly, an object of the invention to provide a range voltage generating circuit which utilizes only a small portion of the number of tubes previously required.

It is a further object of the invention to provide for the control of a phantastron by the application of a direct current voltage to the grid thereof.

These and other objects and advantages of the invention are realized by a circuit in which a bistable locking multivibrator is switched from a first unlocked state to a second locked state upon the application thereto of a sum signal voltage from the time discriminator of the tracking loop. The sum signal exists only when a video signal coincides with one of the gates of the tracking loop. The output of the multivibrator is applied to the anode of a blocking diode. The cathode of the diode is directly coupled to the control grid of a phantastron. Error voltage from the time discriminator of the tracking loop is applied through a very high resistance to the cathode of the diode.

When the multivibrator is in its first or unlocked state the output causes the diode to conduct and shunts the error voltage to ground, thus allowing the sweep generator to run free. When the multivibrator is in its second or locked state the diode is blocked and the error voltage applied to the phantastron causes it to lock at a voltage level which is a function of the error voltage amplitude.

Figure 1:
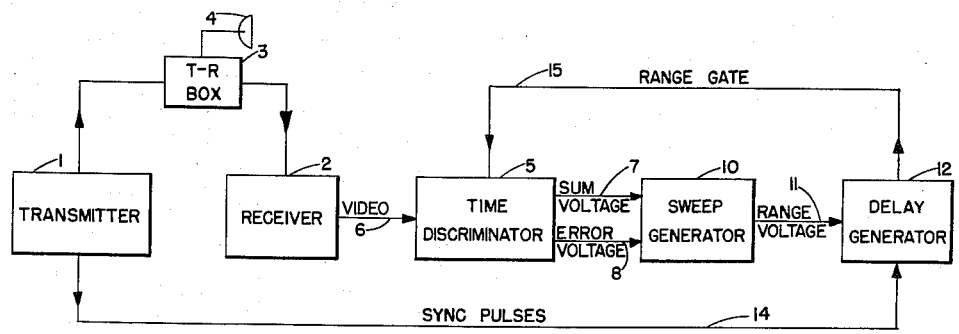
Fig. 1 is a block diagrammatic showing of a tracking loop in which the invention may be utilized.

Referring now more particularly to the drawing, there is shown in Fig. 1 a block diagram of a conventional radar system comprising a transmitter 1 and a receiver 2 connected by way of a T-R box 3 to a directional antenna 4.

Associated with the radar system is a tracking loop comprising a time discriminator 5 having the video output of the receiver 2 applied thereto by means of a connection 6. The time discriminator has two outputs, a sum voltage applied by way of a connection 7 and an error voltage applied by way of a connection 8 to a sweep generator 10.

Figure 3:
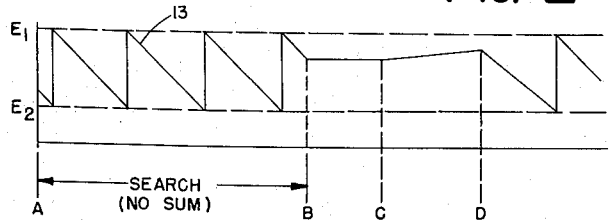

The output of the sweep generator is a range voltage applied by a connection 11 to a delay generator 12. The form of the range voltage curve is shown in Fig. 3 where it is indicated by the solid line 13. The left-hand portion of this curve, between the limits A and B, shows its shape when no target has been encountered. It can be seen that it takes the shape of a sawtooth varying between the limits $E_1$ and $E_2$. The excursions are of a duration which includes a considerable number of pulse intervals of the radar transmitter.

When the gates of the tracking loop encounter a target a sum voltage is generated by the time discriminator 5. This voltage, applied to the sweep generator, arrests the range voltage at a value corresponding to the range of the target and the voltage is maintained at this value unless the range of the target is changing. This is the situation indicated between points B and C of Fig. 3.

If the target is moving in range the time discriminator generates an error voltage and this, applied to the sweep generator, causes the range voltage to change in the same manner, as indicated between C and D of Fig. 3. If the target is lost or rejected, the range voltage resumes its sawtooth excursions as indicated at D.

In addition to the range voltage, there is applied to the delay generator 12 a series of sync pulses derived from the transmitter 1. These pulses are applied by way of a connection 14.

The output of the delay generator is a pulse delayed from the preceding sync pulse by an interval which is determined by the value of the range voltage at the instant a sync pulse is applied to the delay generator. This pulse constitutes a range gate which is applied to the time discriminator 5 by means of a connection 15. The time discriminator generates from this gate a pair of range gates which abut each other in time. The video signal of the radar receiver is also applied to the time discriminator. When a target echo of this signal coincides in time with one or both of the two range gates a sum voltage, as referred to above, is generated. If the video pulse does not coincide equally with both range pulses an error voltage as referred to is generated. The sum and error voltages operate on the sweep generator as described.

Since the mechanisms of the time discriminator and the delay generator are known to the art and do not form a part of this invention they will not be described further.

Figure 2:
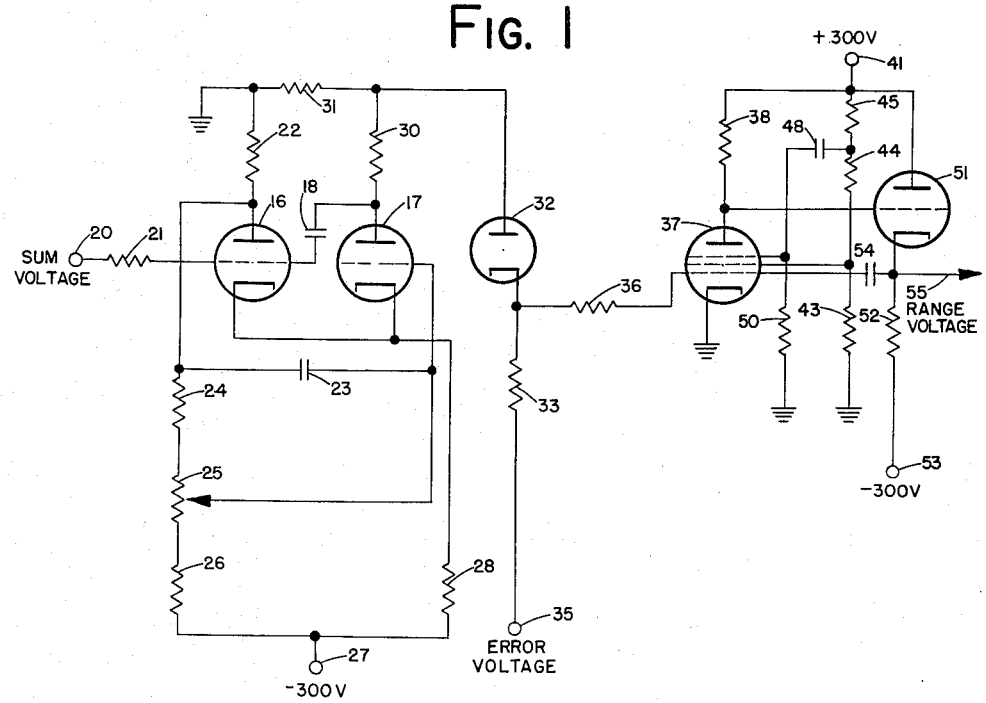
Fig. 2 is a schematic circuit diagram of a circuit embodying the invention; and, Fig. 3 is a graph showing a voltage output curve of a sweep generator, such as the phantastron of Fig. 2.

The sweep generator, as constructed in accordance with the invention, is set forth in detail in Fig. 2. In that figure, a pair of triodes 16 and 17 are connected to form a bistable multivibrator. The plate of tube 17 is connected by way of a capacitor 18 to the grid of tube 16. The grid is also connected to a terminal 20 by way of a resistor 21. The plate of tube 16 is connected to ground through a resistor 22 and to the grid of tube 17 by way of a capacitor 23. This plate is also connected to a negative terminal 27 of a source of voltage indicated as 300 volts through three serially connected resistors 24, 25 and 26. The grid of tubes 17 is directly connected to a movable tap on the resistor 25. The cathodes of the tubes are directly interconnected and are connected to the terminal 27 by way of a resistor 28. The plate of tube 17 is connected to ground through a pair of serial resistors 30 and 31.

The junction of resistors 30 and 31 is connected to the plate of a diode 32. The cathode of this tube is connected through a high valued resistor 33 to a terminal 35 to which is applied error voltage generated by the time discriminator 5.

The cathode of diode 32 is also connected by way of a resistor 36 to the control grid of a pentode 37 forming a part of a phantastron circuit. The cathode of tube 37 is grounded and the plate is connected by way of a resistor 38 to a terminal 41. The terminal 41 is at 300 volts positive. The screen grid of tube 37 is connected through a resistor 43 to ground and by way of a serial string of resistors 44 and 45 to the terminal 41. The suppressor grid of tubes 37 is connected by way of a condenser 48 to the junction of resistors 44 and 45, and through a resistor 50 to ground.

A tube 51 is connected as a cathode follower with its plate directly connected to the terminal 41 and its cathode connected by way of a resistor 52 to a terminal 53 maintained at a —300 volt level. The control grid of tube 37 is connected by way of a condenser 54 to the cathode of tube 51. The output of the circuit may be taken at a terminal 55 connected to the cathode of tube 51.

Before discussing the operation of the circuit of Fig. 2, the following list of component values and types is offered. These values and types have been found satisfactory for a circuit of the type of Fig. 2. They are, however, offered merely by way of example and neither they, nor the values appearing in the drawing, should be considered as restricting the invention.

Resistors:
| | | |
|---|---|---|
| 21 | ohms | 47,000 |
| 22 | do | 4,700 |
| 24 | do | 120,000 |
| 25 | do | 25,000 |
| 26 | do | 150,000 |
| 28 | do | 18,000 |
| 30 | do | 2,700 |
| 31 | do | 2,700 |
| 33 | megohms | 30 |
| 36 | do | 1.5 |
| 38 | ohms | 560,000 |
| 43 | do | 39,000 |
| 44 | do | 68,000 |
| 45 | do | 1,500 |
| 52 | do | 100,000 |

Capacitors:
| | | |
|---|---|---|
| 18 | μμf | 10 |
| 23 | μμf | 220 |
| 48 | μf | .1 |
| 54 | μf | .1 |

Tubes:
| | |
|---|---|
| 16 | 5814A |
| 17 | 5814A |
| 32 | 5726/6AL5W |
| 37 | 12AT7WA |
| 38 | 12AT7WA |

The voltages indicated hereafter as appearing at various points in the circuit are predicated upon the use of the above component values and are likewise not to be considered as restricting the invention.

In the operation of the circuit of Fig. 2, the multivibrator comprising the tubes 16 and 17 is normally in an "unlocked" state in which, due to the bias on the grid of tube 17, that tube is cut off and tube 16 is conducting. In this condition the plate of tube 17 and that of diode 32 are at ground potential. Any error voltage applied to the cathode of diode 32 from the terminal 35 will, under these circumstances, be shunted to ground by way of the diode and will not be applied to the phantastron.

When the sum voltage, which is a negative going excursion, is applied to the terminal 20, tube 16 is cut off and the multivibrator assumes its second or "locked" state with tube 17 conducting. In this condition the plate of tube 17 goes to —25 volts and the diode is rendered non-conductive. The error voltage, is now applied to the cathode of tube 32, will be supplied by way of resistor 36 to the control grid of phantastron tube 37.

The phantastron is of the free-running or self-triggering type generating a recurring sawtooth output without external excitation. This sawtooth voltage is taken from the plate, as indicated, and is initiated at the level $E_1$, falling thereafter to the level $E_2$. During the time this decline is taking place, the control grid is more negative than the cathode and the grid potential is trying to rise. But as it tries to rise the plate potential falls rapidly. This fall, coupled through tube 51 and capacitor 54 to the control grid, greatly reduces the rate of its rise in potential. This results in the slow decline of the plate potential which continues until the plate potential approaches the cathode potential. At this time, the screen grid begins to receive a greater proportion of the current and its potential starts to fall. This fall is coupled to the suppressor grid, and, when it reaches a large enough value, cuts off the plate current flow. The plate voltage then rises carrying with it the potential at the control grid, which increases the cathode to screen current. This regenerative action is quickly completed when the control grid starts to draw current. The plate potential now continues to rise only as fast as capacitor 54 can be charged through cathode follower 51.

Capacitor 48 is large enough that the suppressor grid will not recover until the plate potential has come close to the plate supply voltage level. As soon as the suppressor potential has come close enough to the cathode supply voltage level some plate current will flow. Another regenerative action follows immediately. The downward plate-potential motion, coupled to the control grid, tends to drive it to cut-off potential. This reduces the screen current and the resultant rise in screen and suppressor potential causes a further drop in plate potential and so on. This process terminates with the plate potential down a few volts from the supply voltage level and with the control grid near cut-off. This small dip in the plate potential curve is not shown in Fig. 3. The plate potential now resumes its slow downward movement previously described and the cycle repeats.

The action described above takes place in the phantastron when the multivibrator is in its unlocked state and the diode 32 conducting, with its cathode near zero potential. When the multivibrator is locked, in the presence of a sum voltage, the plate of the diode has about —25 volts impressed on it and, if the target is moving, a negative error voltage lying within a range of between 0 and—10 volts impressed on its cathode. In this situation, as soon as the potential of the control grid reaches the level of the error voltage on the cathode of diode 32 the control grid potential is stabilized, the regenerative action of the phantastron is halted, and it acts as a direct current amplifier, following the movements of the error voltage.

If desired, the cathode follower 51 may be omitted. However, it provides a faster return of the range voltage to its upper limit and provides a low impedance source for the range voltage.

What is claimed is:

1. Means for generating a sweep voltage of recurring sawtooth waveform and for locking the output of said generating means to the level of a control voltage, comprising: a pentode vacuum tube having a cathode, a control grid, a screen grid, a suppressor grid and a plate, means capacitively coupling the plate of said tube to the control grid thereof, means capacitively coupling the screen and suppressor grids of said tube, a source of supply voltage, a voltage dividing network connecting said screen grid, said suppressor grid, said plate and the cathode of said pentode to said source, a diode having a cathode and an anode, means including a resistor conductively connecting the cathode of said diode to the control grid of said pentode, means applying a variable control voltage to said resistor and means for switching the anode of said diode between two voltage reference planes, one of which is more negative than any value of said varying voltage and one of which is more positive than any value of said varying voltage and of such value that the anode potential of said pentode will undergo cyclic excursions characterized by recurring declines of appreciable duration separated by rises of shorter duration.

2. Means for generating a sweep voltage of recurring sawtooth waveform and for locking the output of said generating means to the level of a control voltage, comprising: a pentode vacuum tube having a cathode, a control grid, a screen grid, a suppressor grid and a plate, means capacitively coupling the plate of said tube to the control grid thereof, means capacitively coupling the screen and suppressor grids of said tube, a source of supply voltage, a voltage dividing network connecting said screen grid, said suppressor grid, said plate and the cathode of said pentode to said source, a diode having a cathode and an anode, means including a resistor conductively connecting the cathode of said diode to the control grid of said pentode, means applying a variable control voltage to said resistor and means for switching the anode of said diode between two voltage reference planes, one of which is more negative than any value of said varying voltage and one of which is more positive than any value of said varying voltage and of such value that the anode potential of said pentode will undergo cyclic excursions characterized by recurring declines of appreciable duration separated by rises of shorter duration, said switching means comprising a bistable multivibrator having its output connected to said anode of said diode.

3. A sweep generator forming part of an automatic tracking loop of a radar system, said loop comprising, in addition to said sweep generator, a delay generator receiving range voltage from said sweep generator and sync signals from said radar system and generating therefrom a succession of delayed range gates, a time discriminator having said range gates and the video output of said radar system applied thereto, said time discriminator generating from each of said range gates an early and late gate abutting in time, comparing said video output with said early and late gates, generating from said comparison a sum voltage when a target echo of said video output coincides with one of said gates and generating an error voltage which is a function of inequality of coincidence of said target echo with said early and late gates, said sweep generator comprising: a pentode tube having a cathode, a control grid, a screen grid, a suppressor grid and a plate, means capacitively coupling the plate of said tube to the control grid thereof, means capacitively coupling the screen grid and the suppressor grid of said tube, a source of supply voltage, a voltage dividing network connecting said screen grid and the cathode of said pentode to said source, a plate load resistor, a resistor in series with the control grid of said pentode, a resistor connected between said suppressor grid and said cathode, means applying to said resistor connected to said control grid a reference voltage of such value that the plate potential of said pentode will undergo cyclic excursions characterized by recurring declines of appreciable duration separated by rises of shorter duration, and means actuated by said sum voltage to disconnect said resistor from said reference voltage and apply said error voltage thereto, whereby the variation of said plate potential is arrested and follows the variation of said error voltage.

4. A sweep generator forming part of an automatic tracking loop of a radar system, said loop comprising, in addition to said sweep generator, a delay generator receiving range voltage from said sweep generator and sync signals from said radar system and generating therefrom a succession of delayed range gates, a time discriminator having said range gates and the video output of said radar system applied thereto, said time discriminator generating from each of said range gates an early and late gate abutting in time, comparing said video output with said early and late gates, generating from said comparison a sum voltage when a target echo of said video output coincides with one of said gates and generating an error voltage which is a function of inequality of coincidence of said target echo with said early and late gates, said sweep generator comprising a pentode tube having a cathode, a control grid, a screen grid, a suppressor grid and a plate, means capacitively coupling the plate of said tube to the control grid thereof, means capacitively coupling the screen grid and the suppressor grid of said tube, a source of supply voltage, a voltage dividing network connecting said screen grid, and the cathode of said pentode to said source, a plate load resistor, a resistor in series with the control grid of said pentode, a resistor connected between said suppressor grid and said cathode, means applying to said resistor connected to said control grid a reference voltage of such value that the plate potential of said pentode will undergo cyclic excursions characterized by recurring declines of appreciable duration separated by rises of shorter duration, and means actuated by said sum voltage to disconnect said resistor from said reference voltage and apply said error voltage thereto, whereby the variation of said plate potential is arrested and follows the variation of said error voltage, the last named means comprising a diode having a cathode and an anode, said diode having its cathode connected to said resistor and having said error voltage applied to said cathode, means normally applying said reference potential to the anode of said diode, and means actuated by said sum voltage to lower the potential of said anode of said diode to a value below any value of said error voltage.

5. A sweep generator forming part of an automatic tracking loop of a radar system, said loop comprising, in addition to said sweep generator, a delay generator receiving range voltage from said sweep generator and sync signals from said radar system and generating therefrom a succession of delayed range gates, a time discriminator having said range gates and the video output of said radar system applied thereto, said time discriminator generating from each of said range gates an early and late gate abutting in time, comparing said video output with said early and late gates, generating from said comparison a sum voltage when a target echo of said video output coincides with one of said gates and generating an error voltage which is a function of inequality of coincidence of said target echo with said early and late gates, said sweep generator comprising a pentode tube having a cathode, a control grid, a screen grid, a suppressor grid and a plate, means capacitively coupling the plate of said tube to the control grid thereof, means capacatively coupling the screen grid and the suppressor grid of said tube, a source of supply voltage, a voltage dividing network connecting said screen grid, said suppressor grid, said plate and the cathode of said pentode to said source, a plate load resistor, a resistor in series with the control grid of said pentode, a resistor connected between said suppressor grid and said cathode, means applying to said resistor connected to said control grid a reference voltage of such value that the plate potential of said pentode will undergo cyclic excursions characterized by recurring declines of appreciable duration separated by rises of shorter duration, and means actuated by said sum voltage to disconnect said resistor from said reference voltage and apply said error voltage thereto, whereby the variation of said plate potential is arrested and follows the variation of said error voltage, the last named means comprising a diode having a cathode and an anode, said diode having its cathode connected to said resistor and having said error voltage applied to said cathode, a bistable multivibrator having its output connected to the anode of said diode, said output in one stable state of said multivibrator constituting said reference potential and in the second stable state thereto being a voltage lower than any variation of said error voltage and means applying said sum voltage to said multivibrator in a manner to switch it to said second stable state.

References Cited in the file of this patent

UNITED STATES PATENTS

| | | |
|---|---|---|
| 2,466,705 | Hoeppner | Apr. 12, 1949 |
| 2,500,863 | Posthumus | Mar. 14, 1950 |
| 2,508,672 | Guanella | May 23, 1950 |